UNITED STATES PATENT OFFICE.

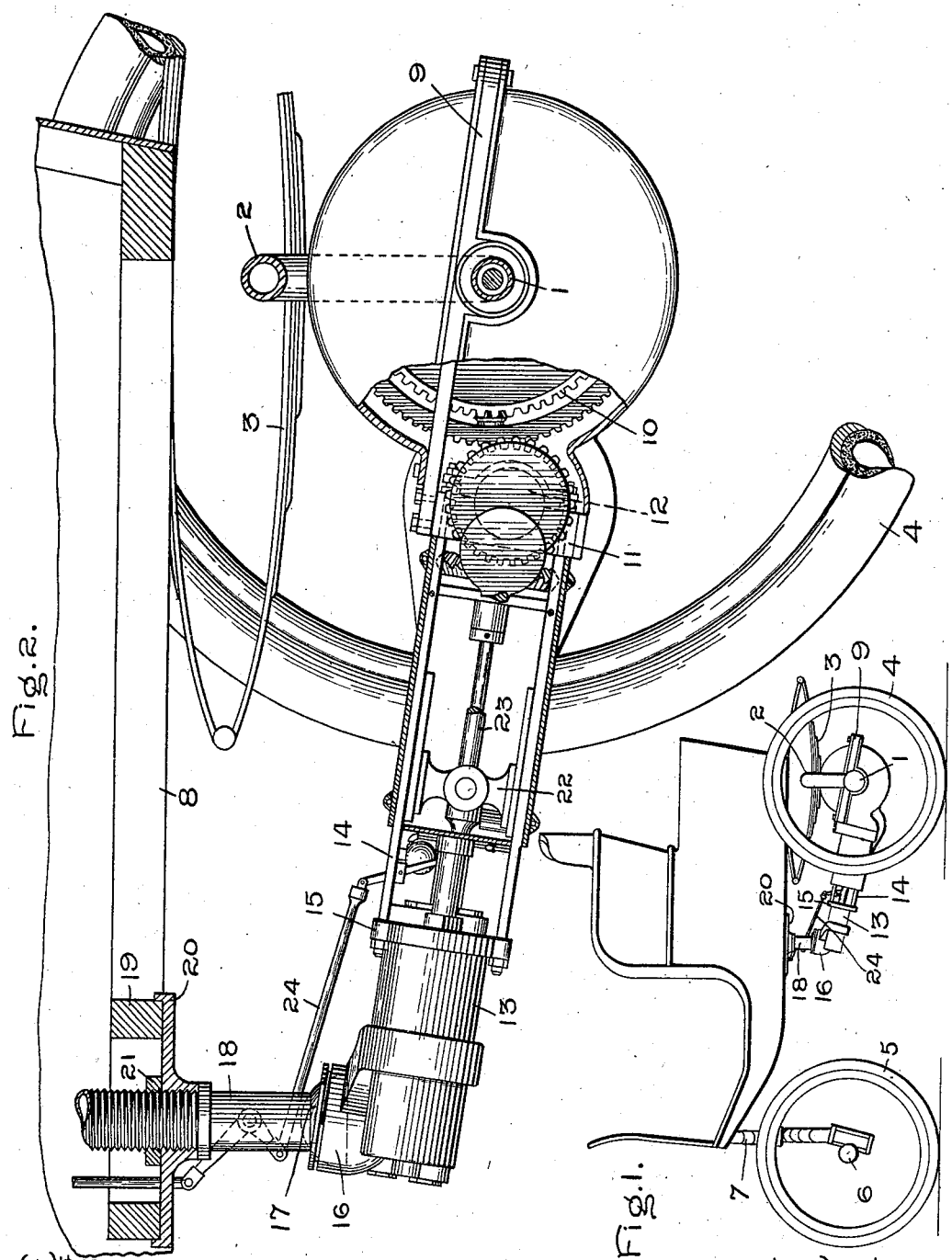

AUGUSTUS A. BALL, JR., OF LYNN, MASSACHUSETTS, ASSIGNOR TO ELIHU THOMSON, OF SWAMPSCOTT, MASSACHUSETTS.

SELF-PROPELLING VEHICLE.

SPECIFICATION forming part of Letters Patent No. 725,394, dated April 14, 1903.

Application filed June 5, 1902. Serial No. 110,317. (No model.)

*To all whom it may concern:*

Be it known that I, AUGUSTUS A. BALL, Jr., a citizen of the United States, residing at Lynn, in the county of Essex, State of Massachusetts, have invented certain new and useful Improvements in Self-Propelled Vehicles, of which the following is a specification.

The present invention relates to self-propelled vehicles, and more particularly to the construction of the frames.

It has for its object to improve and simplify their construction.

In the accompanying drawings, which illustrate an embodiment of my invention, Figure 1 is a side elevation of a vehicle; and Fig. 2 is a detail view, partially in section and partially in elevation, of a motive-power device arranged to form a distance-bar or strut between the vehicle-body and one of the axles.

1 represents a divided axle, and 2 the arched member which extends from one end of the axle to the other. Mounted upon the arched member is a body-supporting spring 3. Only one of these springs is shown in Fig. 2; but it is to be understood that a corresponding spring is provided and mounted on the opposite side of the vehicle. Secured to the axles are driving-wheels 4 of any suitable construction. The wheels are connected through differential gearing in such manner that one can turn independently of the other when the vehicle is traveling in the path of a curve. The front or steering wheels 5 are supported by short axles 6, which in turn are carried by the front stationary axle. This construction is the well-known double-axle suspension, and further description is unnecessary. Secured to the stationary axle and extending either parallel therewith or at right angles, as desired, is a spring or springs 7. The vehicle-body is rigidly secured to the front and rear springs and forms a connection between them. It is to be noted that in the present construction no frame-bars connecting the axles are employed, but that dependence is placed upon the beams 8 of the vehicle to unite them. In order to relieve the strain on the rear springs and maintain the parts in definite relation with respect to each other, it is customary to use distance-bars, which bars are commonly pivotally secured at one end to the axle and at the other end to the vehicle-body or a support which is movable therewith. Another function of the distance-bars is to maintain a fixed distance between the driving and the driven element, and in the case of gear or chain transmission to permit adjustment of the chain.

In my invention I obviate the use of frame and distance bars by using a motive-power device which of itself forms a distance-bar or strut between the driven axle and the vehicle-body. In the present instance I use the term "motive-power device" as broadly including motors propelled by steam, gas, electricity, &c., and the claims are to be interpreted with this in view. In carrying out this feature of my invention the rear axle is divided and a yoke 9 arranged to unite the adjacent ends. The yoke also incloses the differential gears 10. To the yoke is bolted a main bearing block or blocks 11, which block or blocks furnish the necessary support for the motor or engine shaft 12. Extending between a fixed part of the motor, such as the cylinder or cylinders 13, and the bearing-block is a frame of any suitable construction. In the present instance it is composed of parallel bars 14, the number of which can be varied to suit the conditions, but four will be found to work very satisfactorily. These bars are secured at one end to the bearing block or blocks and at the other end to enlarged heads or projections 15 on the cylinders. The frame of the motor or engine is so disposed with respect to the moving parts that it can be made sufficiently strong to withstand all of the strain to which it is subjected. In the present instance a two-cylinder engine is shown, but one or more can be used, and situated between the cylinders and formed integral therewith is a projection 16, which contains a socket adapted to receive the ball 17, that is formed on the lower end of the engine-support 18. In other words, the motive-power device is supported by the axle at one end and by a ball-and-socket joint at the other end. The support 18 is provided with a collar and a screw-threaded end, by means of which it is rigidly secured to the vehicle-body. The support 18 should be rigid with the body in order to prevent lateral movement of the body independent of the axles. Extending across the body are frame-bars 19. These bars are united at a point intermediate their ends by a plate 20, which is provided with a screw-threaded aperture to receive the engine-support. When the support is secured into place, the collar thereon engages with a hub-like projection on the piece 20, and a lock-nut 21 is employed to secure the parts in place.

The engine embodies certain novel features of construction and forms the subject-matter of a separate application filed by me on the 24th day of June, 1902, Serial No. 113,039.

The piston is connected to a sliding cross-head 22, which head is connected to the main crank by a connecting-rod 23. In order to change the position of the cut-off cams, a system of levers 24 is provided which is operated from the vehicle-seat in any suitable manner.

In the drawings the construction of the steering mechanism has been omitted; but it is to be understood that suitable steering means are provided. The rear wheels are shown as being the driving-wheels; but it is obvious that the driving-wheels can be located in front and the rear ones arranged to do the steering.

It is to be noted that the construction is such that the pinion driven by the motor is held in rigid alinement with the differential gear. This permits the vehicle-body to rise and fall without disturbing the alinement. The motor or engine is pivotally supported at a point at or about midway between the sides and extends to a corresponding point on the rear axle. By reason of this construction the usual distance-bars are dispensed with and the motor forms the sole distance-bar or strut between the body and the axle. I am also enabled to dispense with the frame-bars commonly employed to unite the axles and at the same time provide a vehicle which will withstand rough usage.

Another advantage of my improved construction resides in the fact that when once the parts are alined they are kept that way permanently. By using only one strut or distance-piece between the body and driving-axle all danger of twisting the latter out of alinement, such as by moving one bar more than the other, is obviated.

What I claim as new, and desire to secure by Letters Patent of the United States, is—

1. In a vehicle, the combination of a body, a driven axle, and a motor which propels the vehicle and forms the sole distance-bar or strut between the body and the axle.

2. In a vehicle, the combination of an axle, a body, a driving-motor which is pivotally secured to the body at one point and is supported by the axle at another, the said motor forming the sole strut or distance-piece.

3. In a vehicle, the combination of an axle, a body, springs between the axle and the body, and a motor for propelling the vehicle which is supported by the axle at one point and is pivotally secured to the vehicle-body at another, the said motor forming the sole distance-piece or strut between the axle and the body.

4. In a vehicle, the combination of an axle, a body, springs between the axle and the body, a propelling-engine comprising a cylinder and a bar-frame which extends therefrom, an axle-yoke, a bearing-block which unites the bar-frame and the yoke, and a pivotal connection between the engine and the body, the engine and yoke forming the sole strut or distance-piece between the axle and the body.

5. In a vehicle, the combination of a body, a driven axle, springs which connect the axle and the body, a support which is rigidly secured to the body, a pivotal connection between the support and the motor, means for supporting the motor on the axle, and gearing between the motor-shaft and the driving-wheels, the motor-frame acting as the sole distance-piece or strut to hold the gearing in fixed relation.

In witness whereof I have hereunto set my hand this 3d day of June, 1902.

AUGUSTUS A. BALL, JR.

Witnesses:
DUGALD McK. McKILLOP,
HENRY O. WESTENDARP.